United States Patent [19]

Bunting et al.

[11] Patent Number: 5,127,923
[45] Date of Patent: Jul. 7, 1992

[54] COMPOSITE ABRASIVE COMPACT HAVING HIGH THERMAL STABILITY

[75] Inventors: John Bunting; Bill Pope, both of Provo, Utah

[73] Assignee: U.S. Synthetic Corporation, Provo, Utah

[21] Appl. No.: 593,310

[22] Filed: Oct. 3, 1990

Related U.S. Application Data

[63] Continuation of Ser. No. 283,576, Dec. 14, 1988, abandoned, which is a continuation-in-part of Ser. No. 892,186, Jul. 30, 1986, abandoned, which is a continuation of Ser. No. 690,136, Jan. 10, 1985, abandoned.

[51] Int. Cl.$^5$ .............................................. B24D 3/00
[52] U.S. Cl. ....................................... 51/293; 51/295; 51/308; 51/309
[58] Field of Search ................... 51/293, 295, 308, 309

[56] References Cited

U.S. PATENT DOCUMENTS

| | | | |
|---|---|---|---|
| 4,215,999 | 8/1980 | Phaal | 51/309 |
| 4,224,380 | 9/1980 | Bovenkerk et al. | 51/309 |
| 4,225,322 | 9/1980 | Knemeyer | 51/295 |
| 4,241,135 | 12/1980 | Lee et al. | 51/309 |
| 4,268,276 | 5/1981 | Bovenkerk | 51/295 |
| 4,311,490 | 1/1982 | Bovenkerk et al. | 51/309 |
| 4,370,149 | 1/1983 | Hara et al. | 51/309 |
| 4,440,573 | 4/1984 | Ishizuka | 51/309 |
| 4,457,765 | 7/1984 | Wilson | 51/309 |
| 4,572,722 | 2/1986 | Dyer | 51/309 |
| 4,798,026 | 1/1989 | Cerceau | 51/309 |

Primary Examiner—William R. Dixon, Jr.
Assistant Examiner—Willie Thompson
Attorney, Agent, or Firm—Stephen E. Feldman

[57] ABSTRACT

An abrasive compact with a substantially solid body is provided from a mass of abrasive particles which are bonded together on a particle-to-particle basis. A network of interstices is formed within the body by removing the metallic second phase by-product of a solvent catalyst sintering aid. The network of interstices is filled with the carbide by product of a non-catalyst sintering aid forking a solid body. A substrate is bonded to some of the particles and to some of the carbide filling the network of interstices.

42 Claims, 1 Drawing Sheet

COMPOSITE ABRASIVE COMPACT HAVING HIGH THERMAL STABILITY

This application is a continuation of Ser. No. 07/283,576 filed Dec. 14, 1988, abandoned Nov. 26, 1990, which is a continuation in part of Ser. No. 06/892,186 filed Jul. 30, 1986 abandoned Sep. 18, 1989, which is a continuation of Ser. No. 06/690,136, filed Jan. 10, 1985, abandoned Aug. 29, 1986.

BACKGROUND

The invention relates to an improved composite abrasive compact having high thermal stability and method of manufacture.

It is well known to consolidate a mass of natural or synthetic diamond particles into a compact by means of a high pressure, high temperature (HP/HT) press and a suitable diamond-forming sintering aid. Apparatus and techniques to accomplish the necessary sintering of the diamond particles are disclosed in U.S. Pat. Nos. 2,941,248 Hall and 3,141,746 DeLai.

As a means of increasing the strength of a polycrystalline diamond compact and providing a convenient means for mounting as a cutting or abrading surface it has been proposed to attach the compact to a stiff carbide substrate with a strong adhesive bond. U.S. Pat. No. 3,745,623 Wentorf et al teaches sintering of the diamond mass in conjunction with tungsten carbide to produce a composite compact in which the diamond particles are bonded directly to each other and to the cemented carbide substrate.

The DeLai and Wentorf et al processes employ a solvent-catalyst sintering aid, preferably cobalt, to facilitate the particle-to-particle bonding of the diamond during the sintering in the HP/HT press. The cobalt is either added to the diamond mass (DeLai) or derived from the tungsten carbide where it is employed as a cementing agent (Wentorf et al). Diamond and/or composite compacts manufactured in accordance with the teachings of DeLai and Wentorf et al have been limited to low-temperature applications since they thermally degrade at temperatures above approximately 700° C. The thermal degradation results in accelerated wear when such compacts are employed in high-temperature applications such as in rock bits drilling formations with compressive strengths above 20,000 psi.

Thermal degradation of sintered diamond occurs when solvent-catalyst materials, such as cobalt, for example, are used as the sintering agent in the manufacturing process. The same solvent-catalyst action is relied upon using cobalt or other solvent-catalysts to accomplish the cementing action of sintering of diamond and to catalyze the formation of diamonds. This ability, while most pronounced at elevated temperatures, is retained to a lesser degree at temperatures below the melting point of cobalt. Therefore, the cobalt, present in the conventional sintered diamond process dissolves the diamond at the temperatures generated in the drilling of harder rock and at atmosphere pressure the carbon precipitates as graphite at the diamond grain boundaries within the compact. Graphitization is greatly accelerated at and above the melting point of cobalt with consequent degradation of the compact until catastrophic failure when the diamond loses its ability to cut or drill rock.

To avoid the problem of thermal degradation and permit the effective use of polycrystalline diamond compacts at temperatures above 700° C. it has been proposed to leach the metallic second phase from the compact leaving essentially diamond. See U.S. Pat. Nos. 4,224,380 Bovenkerk et al and 4,104,344 Pope et al. However, the diamond compacts produced in accordance with this proposal can not be fully consolidated and have a typical density of approximately 92%. In addition, no practical method has been proposed for adhering a supporting substrate to the compact. It was originally believed that the compact could be leached after it was bonded to the substrate without weakening the strength of the bond, but this has not proved to be feasible.

It has been generally recognized that a diamond compact formed with silicon or other nonsolvent-catalyst as a sintering aid would have enhanced abrasive characteristics plus an extended use at high temperatures above 700° C. In the HP/HT press the silicon is converted to silicon carbide which has excellent abrasive characteristics of its own and which will not catalyze the back-conversion of diamond to graphite. When silicon is used directly in sintering unbonded diamond particles, silicon is converted to silicon carbide and the sintering process is stalled before it is completed and the wear characteristics of the resultant compact are too less abrasion resistant required for drilling harder rock. In addition, because of the apparent chemical reaction between silicon and the cobalt binder in cemented tungsten carbide it has not been possible to bond a tungsten-carbide substrate directly to the compact. See U.S. Pat. No. 4,308,471 Lee et al.

SUMMARY OF THE INVENTION

According to the invention a highly consolidated abrasive compact is provided which has enhanced particle-to-particle bonding, increased density and improved thermal stability performance characteristics and which can be bonded directly to a supporting substrate. The compact is produced by subjecting a mass of abrasive particles, e.g., diamond or cubic born nitride, to multiple pressure cycles at high temperatures. A solvent-catalyst sintering aid is employed in the initial pressure cycle. The compact then possesses residual interconnected porosity in the particle mass which is filled with the solvent-catalyst. Depending upon the degree of sintering, the solvent-catalyst can be removed by leaching or other suitable process. The removal of the solvent-catalyst permits further consolidation and sintering of the particle mass in subsequent pressure cycles. During the final pressure cycle, the abrasive mass can be bonded to a supporting substrate. In addition, a non-catalyst sintering aid, such as silicon, boron or metals rendered non-catalytic by the addition of silicon or boron which may form strong and chemically-resistant carbides, can be used in the second pressure cycle to enhance the sintering process and create a hard abrasive bonding matrix through out the particle mass.

DRAWING

The best mode presently contemplated of carrying out the invention will be understood from the detailed description of the preferred embodiment illustrated in the accompanying drawing in which.

DETAILED DESCRIPTION OF THE ILLUSTRATED EMBODIMENTS

It has been observed that in the process of sintering superhard materials such as diamond and cubic boron nitride the great majority of the particle-to-particle bonding seems to occur during the initial phase of the pressure cycle. While some additional particle-to-particle bonding occurs as the pressure is maintained, the amount of such bonding is progressively reduced with time. The sintering process is essentially stalled after the initial phase when the solvent-catalyst fills the interstices in the particle mass since pressures of sufficient magnitude to drive the process to completion are not presently attainable on a commercial scale. To overcome this dilemma, it is proposed to take advantage of the observed phenomena to produce high density abrasive compacts with a high degree of particle-to-particle bonding using state of the art HP/HT presses.

Figure 1:
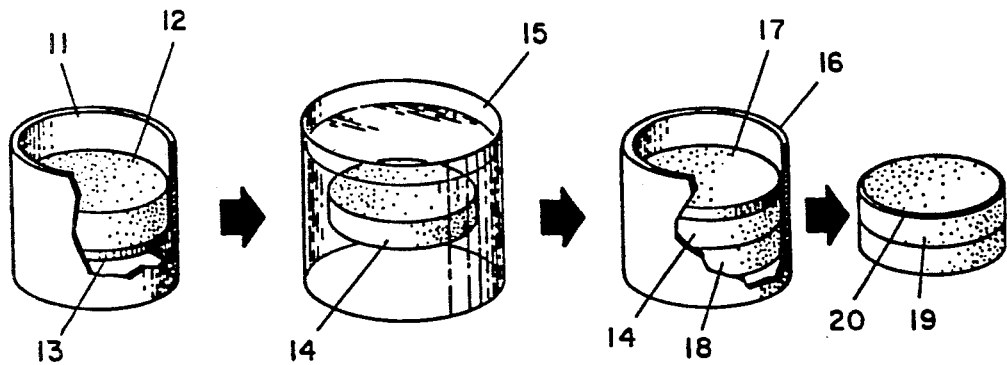
FIG. 1 is a schematic flow diagram representing a method of forming a high density, high temperature abrasive compact.

As illustrated in FIG. 1 of the drawing, the present process contemplates sintering a mass of abrasive particles in a refractory metal cylinder 11. Diamond particles 12 of approximately 1 to 1000 microns in diameter are blended together and placed in the cylinder in contact with a layer 13 of a solvent-catalyst sintering aid of the Group VIII metals or alloys thereof. The cylinder is subjected to high pressure, 55 to 72 Kbar, and high temperature, 1200° C. to 2200° C., in a HP/HT press for a period of 1 to 20 minutes. When the diamond mass is well sintered the compact 14 is removed from the press and placed in a suitable aqua-regia bath 15 for approximately 7 days to dissolve the metallic second phase. The compact 14 then consists essentially of diamond particles bonded together with a network of interconnected interstices extending throughout the compact. While aqua-regia is preferred, the metallic phase may be removed by other acid treatment, liquid zinc extraction, electrolytic depletion or similar processes.

The sintered compact 14 is then placed in a second refractory metal cylinder 16 along with a layer of sintering aid material 17 and a supporting substrate 18 of tungsten carbide or similar tough, stiff material. The cylinder 16 is placed in the HP/HT press and the diamond mass re-sintered and bonded to the substrate. In this step the sintering aid material infiltrates into the interstices in the compact and assists in the further sintering of the diamond. The pressure, temperature and time employed in the re-sintering step are similar to those employed in the initial sintering. It should be noted that because the sintered compact 14 is considerably more dense than the diamond particle mass 12, the effective internal pressure is higher during the resintering than during the sintering, even though the same setting is used on the HP/HT press for both. The resultant composite compact is illustrated at 19 and may include a chamfered edge 20 to inhibit chipping of the cutting edge of the diamond layer.

The sintering aid employed in the re-sintering step of FIG. 1 influences the performance characteristics of the resultant compact. If the compact is expected to be used at intermediate temperatures, 300° C. to 700° C., the sintering aid can be a nickel-iron alloy having a low coefficient of thermal expansion to reduce the differential rate of thermal expansion between the metallic phase and the diamond. However, if high temperature applications, 700° C. and above, are contemplated such as when used for rock bits, a noncatalyst sintering aid may be employed such as silicon, boron, titanium, hafnium, zirconium, nirobium, vanadium, etc., which form carbides during the sintering process. Such metals assist in the sintering of the diamond and the resultant bonding matrix is extremely hard, being in itself and abrasive, such as silicon carbide, boron carbide, etc. In addition it has approximately the same coefficient of thermal expansion as diamond and is chemically inert so it will not catalyze the back-conversion of diamond to graphite. Furthermore, since the bonding matrix is present, the transverse rupture strength of the compact is not impaired. While the use of the non-catalyst sintering aid is described in connection with the substrate it is not limited to that use, but may be employed to form the bonding matrix in an abrasive compact in situations which do not require a substrate.

Any non-catalyst sintering aid having a melting point at ultra-high pressures which is below that of cobalt, such as elemental silicon or alloys thereof, can infiltrate through the interstices into the compact and be converted to the carbide form or non-catalystic silicide or boride form before cobalt is released from the substrate. By placing the proper quantity of the non-catalyst sintering aid adjacent a surface of the compact removed from the substrate, the interstices in the compact can be essentially filled with the carbide form of the sintering aid by the time the temperature in the HP/HT press reaches the melting point of cobalt, approximately 1500° C. When the cobalt is released it is effectively blocked from infiltrating the compact. In addition, since the non-catalyst sintering aid is converted to the carbide or the silicide or boride form prior to contact with the cobalt there is no chemical reaction which might inhibit bonding between the compact and the substrate.

Figure 2:
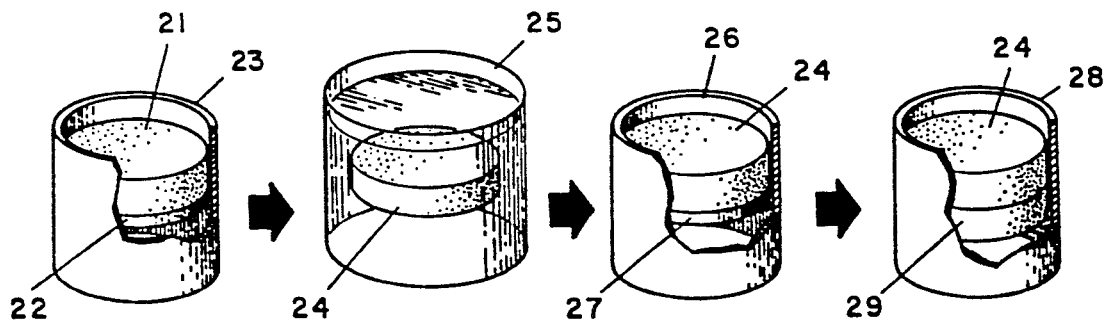
FIG. 2 is a schematic flow diagram illustrating an alternate method of forming a high density, high temperature abrasive compact.

A variation of the process is illustrated in FIG. 2 wherein a layer of diamond particles 21 and a solvent-catalyst 22 are placed in a refractory metal cylinder 23. The cylinder is placed in a HP/HT press. When the diamond mass is well sintered the compact 24 is removed from the press and placed in an aqua-regia bath 25 to remove the metallic second phase. The sintered diamond compact is then placed in a second refractory metal cylinder 26 along with a layer of non-catalyst sintering aid 27 and returned to the HP/HT press for additional sintering. The refractory metal is then removed from the fully sintered compact which is placed in a third refractory cylinder 28 along with a cemented tungsten carbide button 29. The cylinder 28 is then placed in the HP/HT press to bond the tungsten carbide to the compact. This variation of the process is particularly suited for use with non-catalyst sintering aid materials having melting points which are close to, or higher than, that of cobalt, for example, alloys of silicon and nickel or cobalt containing 70 or more percent by weight of the transition metal.

The present process is capable of producing well sintered, densely consolidated abrasive compacts of various thickness. Depending upon the application, the compacts may be formed with or without a bonding matrix. The bonding matrix, after initial sintering to obtain diamond-to-diamond bonding, may be a solvent-catalyst metal, a non-solvent-catalyst element or alloy, which preferably is also a carbide former and the compact may be bonded to a supporting substrate or not, as desired. No pre-treatment of the abrasive particles, such as cleaning or grading in layers, etc. is required. Thin layers are usually easier to sinter, however, the process is applicable to sintering of thick layers 0.060 inches or greater, of particles of a wide range of sizes.

The following examples show how the present invention can be practiced, but should not be construed as limiting. All references cited are expressly incorporated herein by reference.

EXAMPLE I

Sintered diamond compacts were prepared by placing in a molybdenum refractory tube a 0.005 inch molybdenum disc followed by a 0.003 inch disc of cobalt. A pressed mass of diamond particles approximately 0.065 inches thick was placed on top of the cobalt disc. The diamond mass consisted of a blended mixture of synthetic metal bond diamond with the largest particles 149 microns and the smallest particles 105 microns. The diamond mass was covered with a 0.003 inch cobalt disc followed by a 0.005 inch molybdenum disc. The sequence was then repeated five times with a 0.003 inch cobalt disc followed by a 0.065 inch layer of blended diamond particles and a 0.003 inch cobalt disc, followed by a 0.005 inch molybdenum disc. The assembly was outgassed at 650° C. for one hour to remove the wax binder used in pressing the diamond table. The outgassed assembly was then processed in a HP/HT press at 65 Kbar and 1300° C. (as measured by tungsten 5% rhenium vs. tungsten 26% rhenium thermocouples without any correction for pressure) for five minutes. The sintered diamond compacts were then leached in a hot aqua-regia bath until no additional weight loss was noted. The leaching process took three days and the weight loss in the compacts was approximately 10% of the original mass.

The faces of the sintered diamond compacts were then ground essentially flat and the compacts were assembled in a refractory tube with a thin layer of elemental silicon powder positioned between adjacent compacts. A layer of fine silicon powder covered by a 0.005 inch molybdenum disc was placed at one end of the tube. A layer of fine silicon powder was placed at the opposite end of the tube and covered by a 0.005 inch molybdenum disc. The silicon used amounted to 0.03 grams per compact. This assembly was vacuum outgassed at 650° C. for one hour and then processed in a HP/HT press at 65 Kbar and 1350° C. for seven minutes. The diamond-silicon carbide compacts were then treated in an aqua-regia bath for a few minutes to remove the refractory metal and to separate the individual compacts.

Several of the compacts were cycled to 1100° C. and then checked for abrasion resistance by dressing an alumina oxide wheel. The abrasion resistance of the thermal cycled compacts was excellent indicating no significant intergranular cracking or grain boundary failure.

The diamond-silicon carbide compacts were then bonded directly to cemented tungsten carbide substrates by placing a 0.200 inch cemented tungsten carbide button (12% cobalt binder) in a refractory tube followed by a compact and then a 0.005 inch molybdenum disc. A 0.075 inch button of pressed boron nitride was placed on the molybdenum disc and the sequence reversed, with a 0.005 inch molybdenum disc, a compact and a 0.200 inch cemented tungsten carbide button.

Four such assemblies were processed in a HP/HT press at 65 Kbar and 1375° C. for three minutes. Eight specimens, 1-8, of well sintered, densely consolidated composite diamond compacts, consisting only of diamond and silicon carbide approximately 0.034 inches thick bonded directly to cemented tungsten carbide substrates were recovered and finished to provide cutting elements.

A specimen of commercial cobalt-infiltrated composite diamond compact, produced in accordance with the teachings of Wentorf et al U.S. Pat. No. 3,745,623, denoted PDC, was comparison tested with Specimen 1 against a cylinder of Barre granite mounted in a Graziano SAG 22 lathe. Each specimen was placed in a furnace for five minutes. The temperature within the furnace was controlled and was increased in increments. After each incremental increase in temperature each specimen was tested against the Barre granite cylinder using a surface speed of 400-450 sfpm, a depth of cut of 0.040 inches, and a cross feed of 0.057 inches/revolution without coolant.

Figure 3:
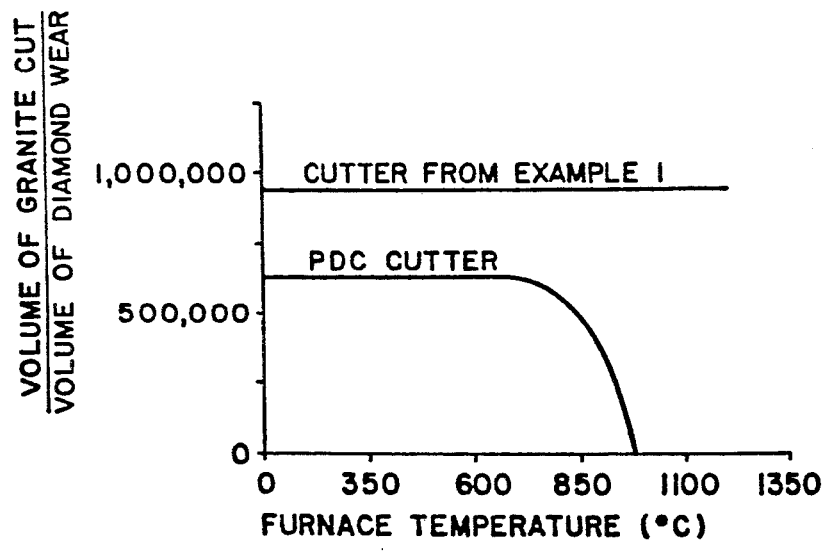
FIG. 3 is a chart of wear characteristics at various temperatures.

The results of the cutting tests are depicted in FIG. 3 where the wear ratio, i.e. volume of granite cut (Vr)/volume of diamond wear (Vd), is plotted against temperature. As shown, the abrasion resistance or rock cutting ability of Specimen 1 was approximately 40% better than that of the Commercial Specimen PCD up to approximately 850° C. At 900° C. the Commercial Specimen PCD cut only a few inches with relatively poor abrasion resistance, and at 950° C. it suffered an apparent intergranular cracking or grain boundary failure. At 1100° C. Specimen 1 showed a slight decline in abrasion resistance, but continued to cut and exhibited no apparent intergranular cracking or grain boundary failure.

EXAMPLE II

Six polycrystalline diamond compacts were sintered, leached and the faces ground according to the procedures of Example I. A 0.200 inch cemented tungsten carbide button was placed in a refractory tube followed in sequence by a compact, a layer of 0.040 grams of fine silicon powder, a 0.005 inch molybdenum disc, and a 0.075 inch boron nitride disc. The sequence was then reversed and three such assemblies were processed in a HP/HT press at 65 Kbar and 1300° C. for five minutes (250 seconds at temperature).

EXAMPLE III

Six additional polycrystalline diamond compacts were sintered, leached and ground according to the procedures of Example I and then assembled in a refractory tube in the same manner as Example II. Three such assemblies were then processed in a HP/HT press at 65 Kbar for 475 seconds, 200 seconds at temperature of 1200° C. and then 200 seconds at temperature of 1375° C.

The composite diamond compacts of Example II, denoted X-2, along with a compact made according to the teachings of Wentorf et al, denoted W-1, were heated to 800° C. for 20 minutes and then comparison tested against a cylinder of Georgia Gray granite mounted in a Graziano SAG 22 lathe. Each specimen was mounted on a tool as the cutting edge and then tested against the Georgia Gray granite using a speed of 130 rpm, a depth of out of 0.020 inches, and cross feed of 0.057 inches/revolution with coolant with the following results:

| Sample | Vr/Vd |
|---|---|
| X-2 | $37.5 \times 10^5$ |
| W-1 | $5 \times 10^5$ |

The composite diamond compacts of example III, denoted X-3, along with a specimen of commercial cobalt-infiltrated composite diamond compact W-2, were heated to 850° C. for 25 minutes and then comparison tested against a cylinder of Barre granite mounted in a Graziano SAG 22 lathe. Each specimen was mounted on a tool as the cutting edge and then tested against the Barre granite using a speed of 190 rpm, a depth of cut of 0.040 inches, and a cross feed of 0.057 inches/revolution without coolant with the following results:

| Sample | Vr/Vd |
|---|---|
| X-3A | $7.9 \times 10^5$ |
| X-3B | $12.1 \times 10^5$ |
| X-3C | $9.6 \times 10^5$ |
| W-2 | failed to cut |

While the invention has been described with reference to specifically illustrated preferred embodiments, it should be realized that various changes may be made without departing from the disclosed inventive subject matter particularly pointed out and claimed herebelow.

What is claimed is:

1. An abrasive compact having high thermal stability at temperatures above 700° C. for cutting and drilling tools, said abrasive compact comprising:
   a plurality of abrasive particles bonded by a first sintering of said plurality of abrasive particles with a solvent-catalyst sintering aid in a first refractory metal cylinder at pressure of 55 to 72 k bars and at temperature of 1200° C. to 2200° C. in particle-to-particle contact at selected surface areas of said plurality of abrasive particles and from which said solvent-catalyst has been removed from between other surface areas of said plurality of abrasive particles which are spaced from each other for forming a network of interstices extending throughout said abrasive compact; and
   b) a binder matrix located in said network of interstices extending throughout said abrasive compact for filling said network interstices, said binder matrix generated by sintering, for a second time, said plurality of abrasive particles with a non-solvent catalyst sintering aid, in a second refractory metal cylinder at pressures of 55 to 72 K bars, at a temperature of 1200° C. to 2200° C. for bonding to at least some of said plurality of abrasive particles at said other surfaces areas.

2. An abrasive compact as in claim 1 and further including:
   a) a substrate bonded directly to at least some of said binder matrix and to at least others of said plurality of abrasive particles.

3. An abrasive compact as in claim 1 and in which said plurality of abrasive particles is a mass of diamond crystals.

4. An abrasive compact as in claim 1 and in which said plurality of abrasive particles is a mass of synthetic diamonds.

5. An abrasive compact as in claim 1 and in which said binder matrix is a strong, chemically resistant binder matrix.

6. An abrasive compact as in claim 1 and in which said binder matrix is a metallic carbide.

7. An abrasive compact as in claim 2 and in which said substrate bonded to said at least others of said abrasive particles and to said binder matrix is cemented tungsten carbide.

8. An abrasive compact as in claim 1 and in which said binder matrix is silicon carbide.

9. An abrasive compact having high thermal stability at temperatures above 700° C. for cutting and drilling tools, said abrasive compact comprising:
   a plurality of abrasive particles of irregular shape having selected surface areas of the respective particles bonded together in particle-to-particle contact by a first sintering of said plurality of abrasive particles with a solvent-catalyst sintering aid in a first refractory metal cylinder at pressure of 55 to 72 K bars at a temperature of 1200° C. to 2200° C.;
   b) a network of interstices throughout said abrasive compact formed by removing a metallic second phase from said abrasive compact formed by sintering said plurality of abrasive particles with said solvent-catalyst sintering aid; and,
   said network of interstices through said abrasive compact filled with a carbide generated by a second sintering of said plurality of abrasive particles with a non-solvent catalyst sintering aid, in a second refractory metal cylinder at pressure of 55 to 72 K bars at a temperature of 1200° C. to 2200° C.

10. An abrasive compact as in claim 9 and further comprising a substrate bonded directly to a portion of abrasive particles of said plurality of abrasive particles and to a portion of said carbide.

11. An abrasive compact as in claim 9 and wherein said metallic second phase is an alloy of a solvent-catalyst sintering aid and an element, a carbide former which renders the solvent-catalyst metal, non-catalytic.

12. An abrasive compact as in claim 9 and in which said plurality of abrasive particles are diamond crystals.

13. An abrasive compact as in claim 9 and in which said plurality of abrasive particles are synthetic diamond crystals.

14. An abrasive compact as in claim 10 and in which said substrate is cemented tungsten carbide.

15. A diamond compact comprising:
   a plurality of diamond crystals bonded directly to each other at selected areas of their surfaces by a first sintering of said plurality of diamond crystals with a solvent-catalyst sintering aid, under a pressure of 55 to 72 K bars and at a temperature of 1200° C. to 2200° C. for generating a metallic second phase within said plurality of diamonds, said plurality of diamond crystals spaced from each other at other areas of their said surfaces for defining a diamond mass with a network of interstices through said diamond mass;
   b) a network of interstices formed by removing said metallic second phase from said diamond mass; and
   said network of interstices filled with a carbide formed by a second sintering of said plurality of diamond particles with a non-solvent catalyst sintering aid under pressure of between 55 to 72 K bars and at a temperature of 1200° C. to 2200° C.

16. A diamond compact as in claim 15 wherein said plurality of diamond crystals are synthetic diamonds.

17. A diamond compact as in claim 15 and further comprising:
  a) a substrate bonded to at least a portion of diamonds of said plurality of diamonds and bonded to at least a portion of said carbide filling said network of interstices.

18. A diamond compact as in claim 15 and in which said metallic second phase is an alloy of a solvent-catalyst sintering aid, and an element which renders the solvent-catalyst non-catalytic.

19. A diamond compact as in claim 17 and in which said substrate is a metallic carbide.

20. An abrasive compact having a substantially solid body having high thermal stability at temperatures above 700° C. for cutting and drilling tools, said abrasive compact comprising:
  a plurality of abrasive particles bonded, at least in part, one to another along selected surface areas of adjacent particles such plurality of abrasive particles having been sintered in a first refractory metal cylinder in the presence of a solvent-catalyst sintering aid at pressures of 55 to 72 K bars and at a temperature of 1200° C. to 2200° C. a network of interconnected spaces defined by other surface areas of adjacent particles where said other surface areas of adjacent particles are spaced from each others;
  b) said network of interconnected spaces formed by removal of a metallic second phase from such interconnected spaces said metallic second phase having been an alloy of sao solvent-catalyst sintering aid:
  c) said network of interconnected spaces filled with a carbide generated by a second sintering of said plurality of abrasive particles in a second refractory metal cylinder in the presence of a non-solvent catalyst sintering aid at a pressure of between 55 to 72 K bars and at a temperature of 1200° C. to 2200° C.; and
  d) a substrate bonded to at least some surface areas of some abrasive particles and bonded to at least some said carbide for forming an essentially solid abrasive compact.

21. A process for preparing a high density abrasive compact having high thermal compact having high thermal stability at temperatures above 700° C. for cutting and drilling tools comprising:
  a) sintering a mass of abrasive particles with a solvent catalyst sintering aid in a refractory metal cylinder at pressures of 55 to 72 K bars and at a temperature of 1200° C. to 1600° C. for ten minutes for forming a compact mass of interconnected abrasive particles with a metallic second phase;
  b) removing said compact mass from said refractory metal cylinder and removing said metallic second phase from said compact mass for creating a network of interconnected interstices throughout said compact mass;
  c) placing said compact mass in a refractory metal cylinder along with a layer of sintering aid material and a supporting substrate and sintering the combination in said cylinder at internal pressures of 55 to 65 K bars and at a temperature of 1200° C. to 1600° C. so that said sintering aid material infiltrates into said interconnecting interstices and said supporting substrate is bonded to said compact.

22. A process as set forth in claim 21 wherein the layer of sintering aid material placed in said refractory metal cylinder is a non-catalyst sintering aid which forms a carbide during the sintering process for forming a hard abrasive bonding matrix throughout said compact.

23. A process as set forth in claim 22 and in which said carbide formed from said non-catalyst sintering aid bonds to said compact to said supportive substrate.

24. A process as set forth in claim 21 wherein the layer of sintering aid material placed in said refractory metal cylinder in step (c) is silicon.

25. A process as set forth in claim 21 wherein the layer of sintering aid material placed in said refractory metal cylinder in step (c) is boron.

26. A process as set forth in claim 21 wherein the layer of sintering aid material placed in said refractory metal cylinder in step (c) is titanium.

27. A process as set forth in claim 21 wherein the layer of sintering aid material placed in said refractory metal cylinder in step (c) is hafnium.

28. A process as set forth in claim 21 wherein the layer of sintering aid material placed in said refractory metal cylinder in step (c) is zirconium.

29. A process as set forth in claim 21 wherein the layer of sintering aid material placed in said refractory metal cylinder in step (c) is niobium.

30. A process as set forth in claim 21 wherein the layer of sintering aid material placed in said refractory metal cylinder in step (c) is vanadium.

31. A process as set forth in claim 21 wherein the layer of sintering aid material placed in said refractory metal cylinder in step (c) is an alloy or compound of silicon and a catalyst.

32. A process as set forth in claim 21 wherein the layer of sintering aid material placed in said refractory metal cylinder in step (c) is an alloy or compound of boron and a catalyst solvent metal.

33. A process as set forth in claim 21 wherein said mass of abrasive particles is diamond particles.

34. A process as set forth in claim 21 wherein said mass of abrasive particles is cubic boron nitride.

35. A process for preparing a high density abrasive tool compact for cutting and drilling tools comprising:
  a) placing a layer of abrasive particles and a solvent-catalyst in a refractory metal cylinder in preparation for sintering;
  applying pressure to said layer and said solvent-catalyst of 55 to 65 K bars and subjecting said layer and said solvent-catalyst to temperatures of 1200° C. to 1600° C. for a period of one to ten minutes for sintering said layer of abrasive particles into a compact abrasive mass with metallic second phase;
  c) removing said compact mass with metallic second phase from said refractory meal cylinder;
  d) removing said metallic second phase from said compact abrasive mass for creating a network of interconnecting interstices throughout said compact mass;
  e) placing said compact abrasive mass and a non-catalyst sintering aid material in a refractory metal cylinder in preparation for sintering; and
  f) applying pressure to said compact abrasive mass and said non-catalyst sintering aid material of 55 to 65 K bar and subjecting said compact mass and said non-catalyst sintering aid material to temperatures of 1200° C. to 1600° C. for driving said non-catalyst sintering aid material into said network of interconnected interstices for forming said tool compact.

36. A process for preparing a high density abrasive tool compact as in claim 35 wherein said abrasive particles are diamond particles.

37. A process for preparing a high density abrasive tool compact as in claim 35 wherein said abrasive particles are cubic boron nitride.

38. A process for preparing a high density abrasive tool compact as in claim 35 and wherein removing said metallic second phase is accomplished by dissolving said metallic second phase.

39. A process for preparing a high density abrasive tool compact as in claim 35 and wherein removing said metallic second phase is accomplished by dissolving said metallic second phase in an aqua-regia bath.

40. A process for preparing a high density abrasive tool compact as in claim 35 and wherein removing said metallic second phase is accomplished by dissolving said metallic second phase by acid treatment.

41. A process for preparing a high density abrasive tool compact as in claim 35 and wherein said non-catalyst sintering aid material forms a carbide during the sintering processes.

42. A process as set froth in claim 21 wherein said mass of abrasive particles is a mixture of diamond particles and cubic boron nitride.

* * * * *